Dec. 11, 1928.
H. H. MORGAN
CONVEYER
Filed Nov. 22, 1926
1,695,054
2 Sheets-Sheet 1
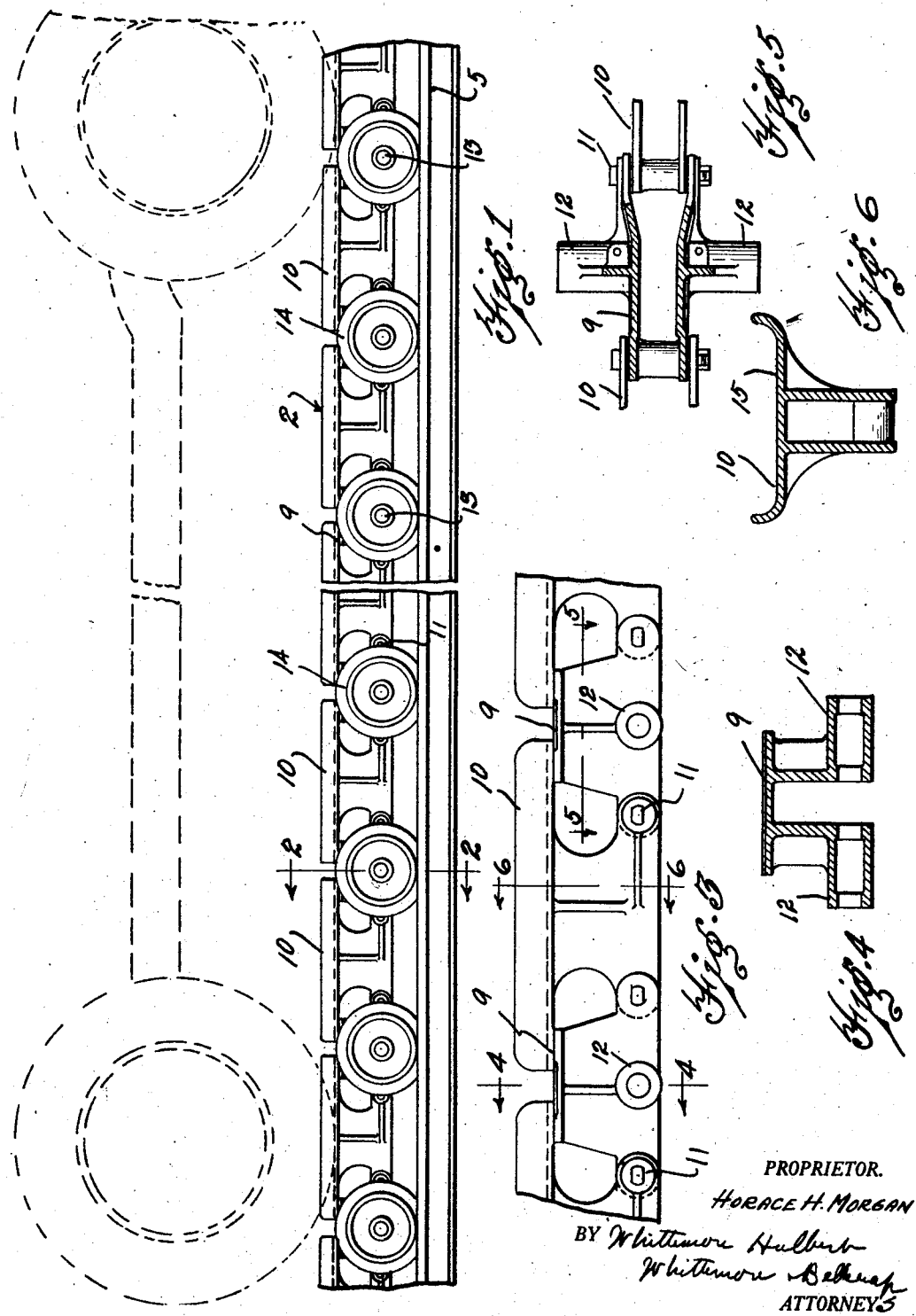
PROPRIETOR.
HORACE H. MORGAN
BY Whittemore Hulbert
Whittemore Belknap
ATTORNEYS Dec. 11, 1928.
H. H. MORGAN
1,695,054
CONVEYER
Filed Nov. 22, 1926
2 Sheets-Sheet 2
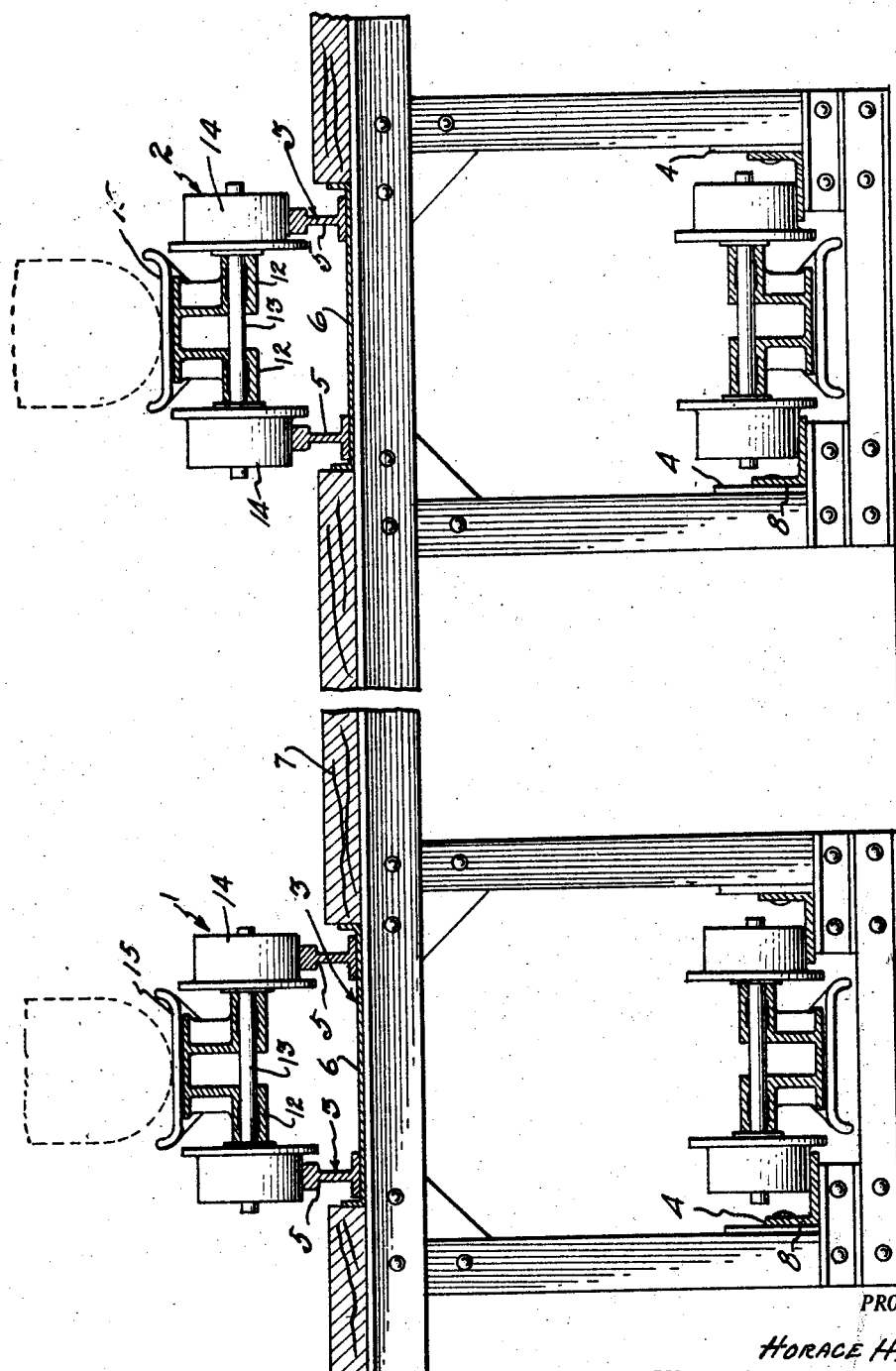
PROPRIETOR.
HORACE H. MORGAN
BY Whittemore Hulbert
Whittemore Belknap
ATTORNEYS Patented Dec. 11, 1928.

1,695,054

UNITED STATES PATENT OFFICE.

HORACE H. MORGAN, OF DETROIT, MICHIGAN, ASSIGNOR TO PALMER-BEE COMPANY, OF DETROIT, MICHIGAN, A CORPORATION OF MICHIGAN.

CONVEYER.

Application filed November 22, 1926. Serial No. 149,991.

The invention relates to conveyers and is particularly adapted to conveyers for vehicles such as motor vehicles during their final assembly. One of the objects of the invention is to provide a conveyer for vehicles permitting moving the latter backward or forward relative to the conveyer and also permitting application of the brakes of the latter without interfering with the operation of the conveyer. Another object is to provide a novel construction of chain for the conveyer in which the work engaging links are supported upon other links. With these as well as other objects in view, the invention resides in the novel features of construction and combinations and arrangements of parts as more fully hereinafter set forth.

In the drawings:—

Figure 1 is a side elevation of a portion of the conveyer embodying my invention;

Figure 2 is a cross section on the line 2—2 of Figure 1;

Figure 3 is an enlarged side elevation of a portion of the conveyer with certain of the wheels removed;

Figures 4, 5 and 6 are cross sections respectively on the lines 4—4, 5—5 and 6—6 of Figure 3.

The conveyer shown in the present instance is designed particularly for conveying motor vehicles during their final assembly. The conveyer comprises the parallel endless chains 1 and 2 spaced from each other to take care of the tread of the motor vehicle wheels, the tracks 3 for supporting the upper portion of the chains and the tracks 4 for supporting the lower portions of the chains, these tracks being mounted upon a suitable frame. Each track 3 comprises the parallel track members 5 spaced from each other and resting upon the channel 6 which in turn rests upon the frame and is located in a recess formed in the flooring 7. Each track 4 comprises the track members 8 in substantial vertical alignment with the track members 5 and supported above the bottom of the pit a sufficient distance to provide for the depending portions of the chain which extend therebetween.

The wheels of the motor vehicle rest directly upon the chains and inasmuch as each chain is formed in the same manner, but one will be described. This chain comprises the alternate links 9 and the intermediate links 10, both being preferably channel-shaped, as shown particularly in Figures 4, 5 and 6. The lower portions of these links have their ends pivotally connected to each other as at 11 and the lower portions of the alternate links 9 are provided with the centrally located transverse aligned bosses 12, through which the shafts 13 extend, these shafts being preferably in horizontal alignment with the pivots 11. 14 are wheels upon the ends of the shafts 13 and adapted to engage the track members 5 and 8. The intermediate links 10 have integral upper work engaging portions 15 which are located above the pivots 11 and the ends of which extend over and are adapted to be supported by the upper portions of the alternate links 9, the adjacent ends of these alternate links terminating to provide clearance therebetween. The work engaging portions 15 may in some instances be flat, but as shown in the present instance, they are trough-shaped to prevent lateral displacement of the motor vehicle from the conveyer.

From the above description, it will be readily seen that I have provided a conveyer for vehicles which is so arranged that the vehicles may be moved forward or rearward relative to the conveyer without interfering with its operation and the vehicles advanced by the conveyer without the necessity of revolving the wheels of the vehicles. It will also be seen that I have provided a novel construction of conveyer chain in which the work engaging links are supported upon the load carrying links of the chain independently of the pivots connecting these links.

What I claim as my invention is:

1. In a conveyer, the combination with a track, of a chain including alternate links supported upon said track and an intermediate work engaging link having its ends supported upon said alternate links.

2. In a conveyer, the combination with a track, of a chain including alternate links supported upon said track and an intermediate link having a work engaging portion with its ends supported upon said alternate links.

3. In a conveyer, the combination with a track, of a chain including alternate links supported upon said track, and an intermediate link pivotally connected to said alternate links and having a work engaging portion above the pivots with its ends supported upon said alternate links.

4. In a conveyer, the combination with a track, of a chain including alternate links and an intermediate link pivotally connected to said alternate links and having a work engaging portion above the pivots with its ends overlapping and resting upon said alternate links, and wheels intermediate the ends of said alternate links and engaging said track for supporting the former upon the latter.

5. In a conveyer, the combination with a track, of a chain including alternate channel-shaped links and intermediate channel-shaped links, pivots extending through the ends of the lower portions of said links for connecting the same to each other, shafts extending through the lower portions of said alternate links intermediate their ends, wheels upon said shafts and engaging said tracks for supporting said alternate links upon said tracks and work engaging portions at the upper edges of said intermediate links with their ends overlapping and resting upon said alternate links.

6. In a conveyer, the combination with a track, of a chain including alternate links supported upon said track, and an intermediate link having a lower portion pivotally connected to said alternate links and an integral trough-shaped work engaging upper portion with its ends overlapping and resting upon said alternate links.

7. In a conveyer, a chain including conveyer supporting links and work engaging links pivotally connected to said first-mentioned links and supported thereby independently of the pivots.

8. In a conveyer, the combination with a track, of a chain including alternate links supported upon said track and having substantially flat supporting portions at their upper edges, and an intermediate link having a lower portion pivotally connected to said alternate links and an integral work engaging upper portion having its end portions overhanging the lower portion of said link, said end portions overlapping said alternate links and resting upon the substantially flat supporting portions thereof.

9. In a conveyer, the combination with a track, of a chain including alternate channel-shaped links supported upon said track and having their base portions formed into flat supporting portions, and an intermediate channel-shaped link having a lower portion pivotally connected to said alternate links and having its base portion extended longitudinally and transversely to form a work supporting portion having its end portions overlapping and resting upon the flat supporting portions of said alternate links.

In testimony whereof I affix my signature.

HORACE H. MORGAN.